(12) United States Patent
Okamoto et al.

(10) Patent No.: US 7,530,587 B2
(45) Date of Patent: May 12, 2009

(54) VEHICLE SUSPENSION SYSTEM

(75) Inventors: Kimio Okamoto, Saitama (JP);
Kazutaka Suzuki, Saitama (JP);
Shigenori Inaba, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 252 days.

(21) Appl. No.: 11/205,312

(22) Filed: Aug. 17, 2005

(65) Prior Publication Data

US 2006/0049604 A1 Mar. 9, 2006

(30) Foreign Application Priority Data

Sep. 6, 2004 (JP) ............... 2004-258117

(51) Int. Cl.
*B60G 15/00* (2006.01)
(52) U.S. Cl. ............ 280/124.147; 280/124.155
(58) Field of Classification Search .......... 280/124.116, 280/124.145, 124.146, 124.147, 124.154, 280/124.155; 267/140, 153, 219, 292; *B60G 11/54*
See application file for complete search history.

(56) References Cited

U.S. PATENT DOCUMENTS

| | | | | |
|---|---|---|---|---|
| 5,238,233 A | * | 8/1993 | Hein | 267/153 |
| 5,257,730 A | * | 11/1993 | Nakaura | 267/220 |
| 5,857,687 A | * | 1/1999 | Ishii | 280/124.177 |
| 6,296,237 B1 | * | 10/2001 | Nagai | 267/220 |
| 6,733,023 B2 | * | 5/2004 | Remmert et al. | 280/124.179 |
| 6,913,253 B2 | * | 7/2005 | Mennesson | 267/220 |
| 2006/0043659 A1 | * | 3/2006 | Gofron et al. | 267/220 |

FOREIGN PATENT DOCUMENTS

| | | |
|---|---|---|
| JP | 08-042624 A | 2/1996 |
| JP | 09-052505 A | 2/1997 |
| JP | 09-079305 A | 3/1997 |
| JP | 9-272317 | 10/1997 |

* cited by examiner

*Primary Examiner*—John Q. Nguyen
*Assistant Examiner*—Robert A. Coker
(74) *Attorney, Agent, or Firm*—Arent Fox LLP

(57) ABSTRACT

A vehicle suspension system connects a swing member to a vehicle body. The vehicle suspension system includes a bump stopper, which is provided on one of the swing member and the vehicle body and includes an axis, a substantially cylindrical tip end which abuts an abutment surface provided on the other one of the swing member and the vehicle body, and an apex formed at the tip end. Abutment is initiated, in a circumferential direction of the tip end, in a state wherein the abutment surface inclines relative to the axis of the bump stopper. The apex at the tip end of the bump stopper first abuts the abutment surface and is located at an intermediate portion of the bump stopper in a direction of a wall thickness (t) of the bump stopper. A plurality of projections may also be formed on the tip end of the bump stopper.

21 Claims, 5 Drawing Sheets

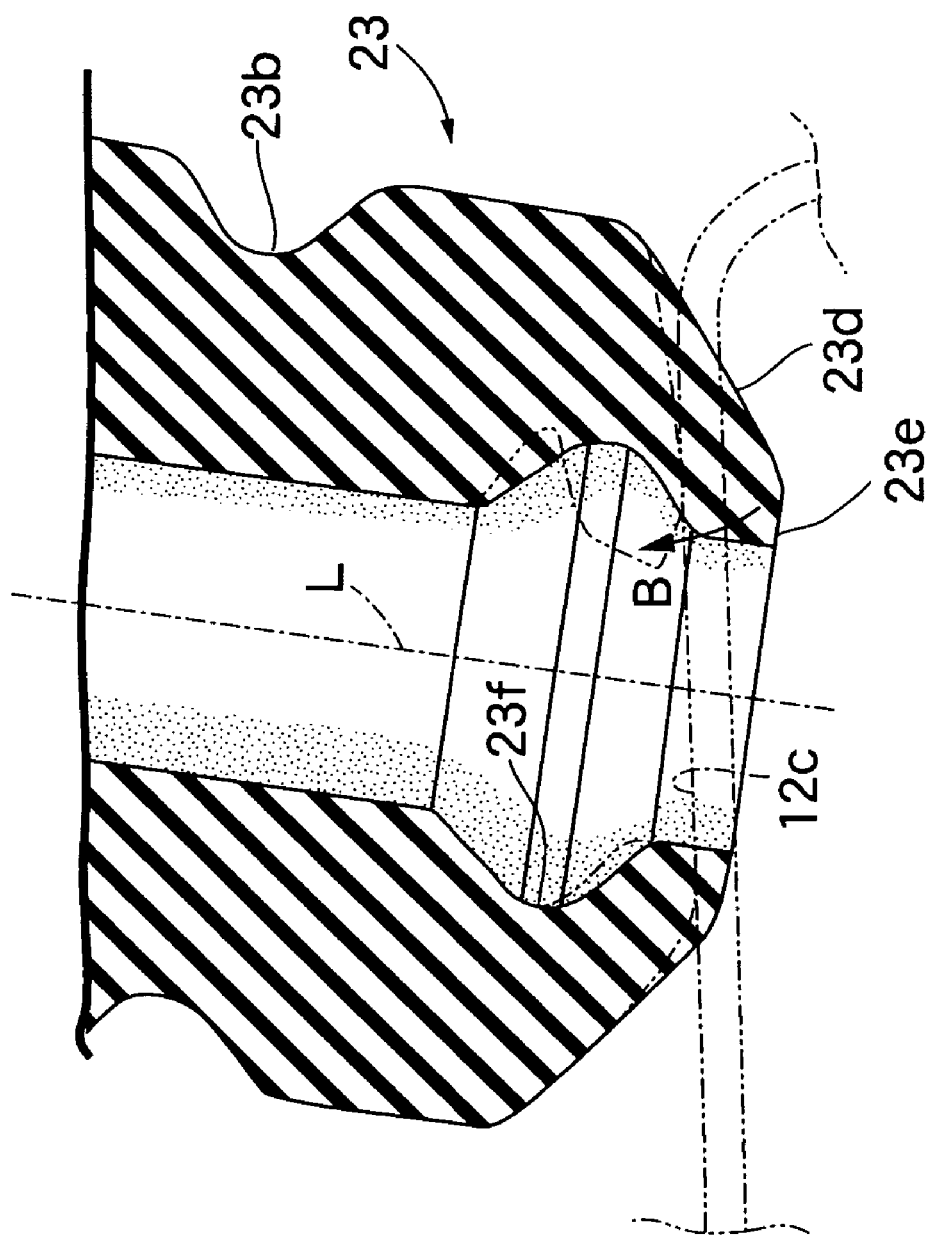

VEHICLE SUSPENSION SYSTEM

The present invention is based upon Japanese priority application No. 2004-258117, which is hereby incorporated in its entirety herein by reference.

BACKGROUND OF THE INVENTION

1. Field of the Invention

The present invention relates to a vehicle suspension system which restricts a maximum bump amount of a vehicle body by connecting a swing member, which rotatably supports a wheel and swings up and down, to a vehicle body via a suspension spring. A substantially cylindrical tip end of a bump stopper provided in one of the swing member and the vehicle body abuts an abutment surface provided in the other one of the swing member and the vehicle body.

2. Description of the Related Art

Japanese Patent Application Laid-open No. 9-272317 discloses a vehicle suspension system which supports a knuckle that rotatably supports a wheel on a vehicle body via a suspension arm that is movable in up and down directions. The suspension system includes a bump stopper that is provided on a vehicle body side and is abuttingly opposite an abutment surface provided on a top surface of the suspension arm. When the vehicle body bumps to a large extent while compressing the suspension spring, namely, when the vehicle body lowers in a direction toward the road surface, the bump stopper abuts the abutment surface to restrict the maximum bump amount of the vehicle body.

In the system disclosed in Japanese Patent Application Laid-open No. 9-272317, the abutment surface is orthogonal to the axis of the bump stopper. However, in the case where the abutment surface is inclined with respect to the axis of the bump stopper for reasons that are provided below, the bump stopper slips on the abutment surface when the bump stopper abuts the abutment surface, thereby generating abnormal and unpleasant noises.

SUMMARY OF THE INVENTION

The present invention has been achieved in view of the above-mentioned circumstances. One aspect of the present invention is to reduce the number and frequency of abnormal noises that are generated when the bump stopper of the suspension system abuts the abutment surface.

In order to achieve the above-mentioned aspect, according to a first feature of the invention, there is provided a vehicle suspension system which restricts a maximum bump amount of a vehicle body by connecting a swing member, which rotatably supports a wheel and swings up and down, to the vehicle body via a suspension spring. A substantially cylindrical tip end of a bump stopper provided in one of the swing member and the vehicle body abuts an abutment surface provided in the other one of the swing member and the vehicle body. It should be noted that abutment starts from a part in a circumferential direction of the tip end of the bump stopper in a state wherein the abutment surface inclines relative to an axis of the bump stopper. Accordingly, an apex part at the tip end of the bump stopper, which first abuts the abutment surface, is located at an intermediate portion in a direction of a wall thickness of the bump stopper.

Also, in order to achieve the above-mentioned aspect, according to a second feature of the invention, there is provided a vehicle suspension system which is substantially similar to the vehicle suspension system according to the first feature, but which also includes a plurality of projections which are capable of abutting the abutment surface and are formed on the tip end of the bump stopper.

A lower arm corresponds to the swing member of the present invention.

With the arrangement of the first feature, the maximum bump amount of a vehicle body is restricted by a substantially cylindrical tip end of a bump stopper provided in one of the swing member and the vehicle body abutting an abutment surface provided in the other one of the swing member and the vehicle body. Abutment is initiated by a part in a circumferential direction of the tip end of the bump stopper in a state wherein the abutment surface inclines with respect to an axis of the bump stopper. As such, the tip end of the bump stopper abutting the abutment surface falls in the axial direction, and slip occurs between the tip end and the abutment surface, thereby causing abnormal noises to be generated. However, an apex part at the tip end of the bump stopper, which first abuts the abutment surface, is located at an intermediate portion in a direction of a wall thickness of the bump stopper. Accordingly, the falling of the tip end of the bump stopper is restricted, making it difficult for the tip end to slip and thus suppressing generation of abnormal noises.

With the arrangement of the second feature, the maximum bump amount of a vehicle body is restricted by a substantially cylindrical tip end of a bump stopper provided in one of the swing member and the vehicle body abutting an abutment surface provided in the other one of the swing member and the vehicle body. Abutment is initiated by a part in a circumferential direction of the tip end of the bump stopper in a state wherein the abutment surface inclines with respect to an axis of the bump stopper. As such, the tip end of the bump stopper abutting the abutment surface falls in the axial direction, and slip occurs between the tip end and the abutment surface, thereby causing abnormal noises to be generated. However, a plurality of projections, which are capable of abutting the abutment surface, are formed at the tip end of the bump stopper. Accordingly, the tip end of the bump stopper is brought into point contact with the abutment surface which reduces the amount of abnormal noises which are generated.

The above-described aspects, other aspects, characteristics, and advantages of the present invention will become apparent from a preferred embodiment which will be described in detail below by reference to the attached drawings.

BRIEF DESCRIPTION OF THE DRAWINGS

FIG. 5 is a sectional view corresponding to FIG. 2, illustrating a comparative example.

DESCRIPTION OF THE PREFERRED EMBODIMENT

FIGS. 1 to 4 illustrate a preferred embodiment of the present invention.

Figure 1:
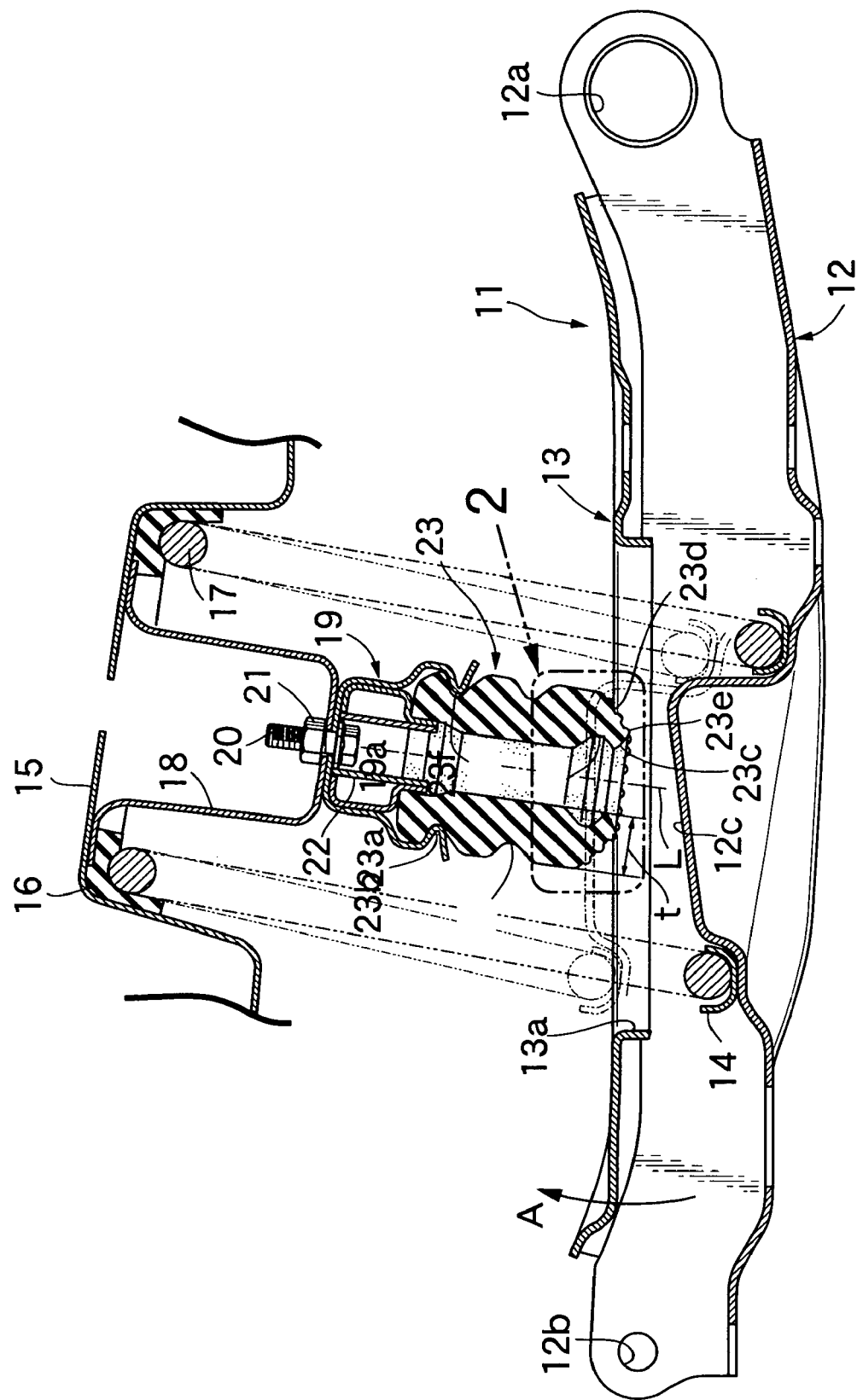
FIG. 1 is a sectional view of a vehicle suspension system according to a preferred embodiment of the present invention.

As shown in FIG. 1, a lower arm 11 of a vehicle suspension system is illustrated which has a cationic coating applied to a press-formed steel plate. The lower arm 11 includes a lower member 12, that is U-shaped in section and has an opened top surface, and an upper member 13 connected to the lower member 12 which covers the opening of the lower member's top surface. The lower member 12 includes, at an inner end in a widthwise direction of the vehicle, an inner pivotal support part 12a pivotally supported on the body of the vehicle via a rubber bush joint; and, at an outer end in the widthwise direction of the vehicle, an outer pivotal support part 12b pivotally supported on a knuckle via a ball joint. A circular abutment surface 12c protrudes upward at a central part of the lower member 12. An annular lower spring seat 14 is disposed around the abutment surface 12c. A circular opening 13a is formed in a central part of the upper member 13 and faces a space above the lower spring seat 14 on the lower member 12.

A rubber seat 16 is disposed on a lower surface of an upper spring seat 15 provided in a vehicle body frame and projects upward. A suspension spring 17, having a coil spring with upper and lower ends supported on the rubber seat 16 and the lower spring seat 14, respectively, freely passes through the circular opening 13a of the upper member 13. A cup-shaped bracket 18, having an open top surface, is fixed to a center of the lower surface of the spring seat 15 and faces downward. A cup-shaped bump stopper supporting member 19, having an open lower surface, is fixed to a bottom part of the bracket 18 with a bolt 20 and a nut 21. A spacer 22 is housed in an inner surface of an upper part of the bump stopper supporting member 19. An upper part of a bump stopper 23 is fitted and held between the inner surface of a lower part of the bump stopper supporting member 19 and a lower surface of the spacer 22.

Figure 2:
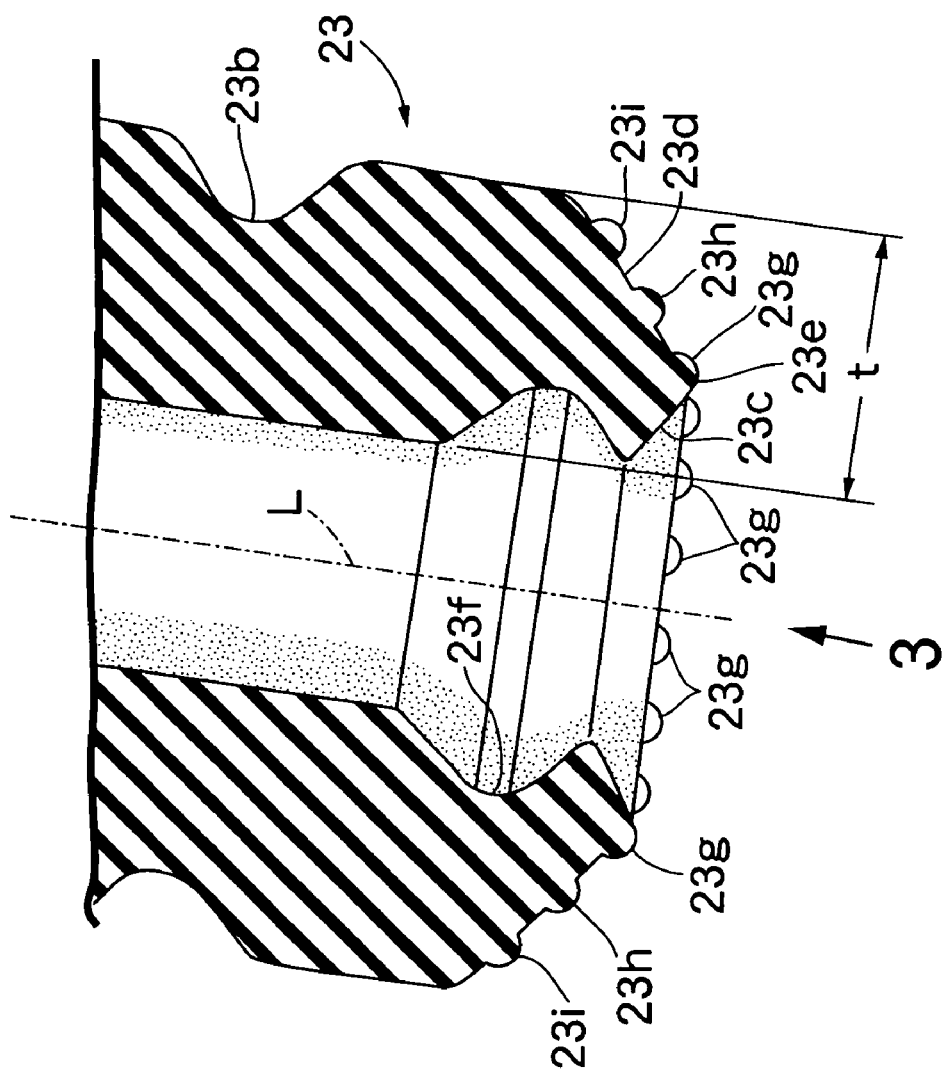
FIG. 2 is an enlarged view of a portion of the suspension system illustrated in FIG. 1.
Figure 3:
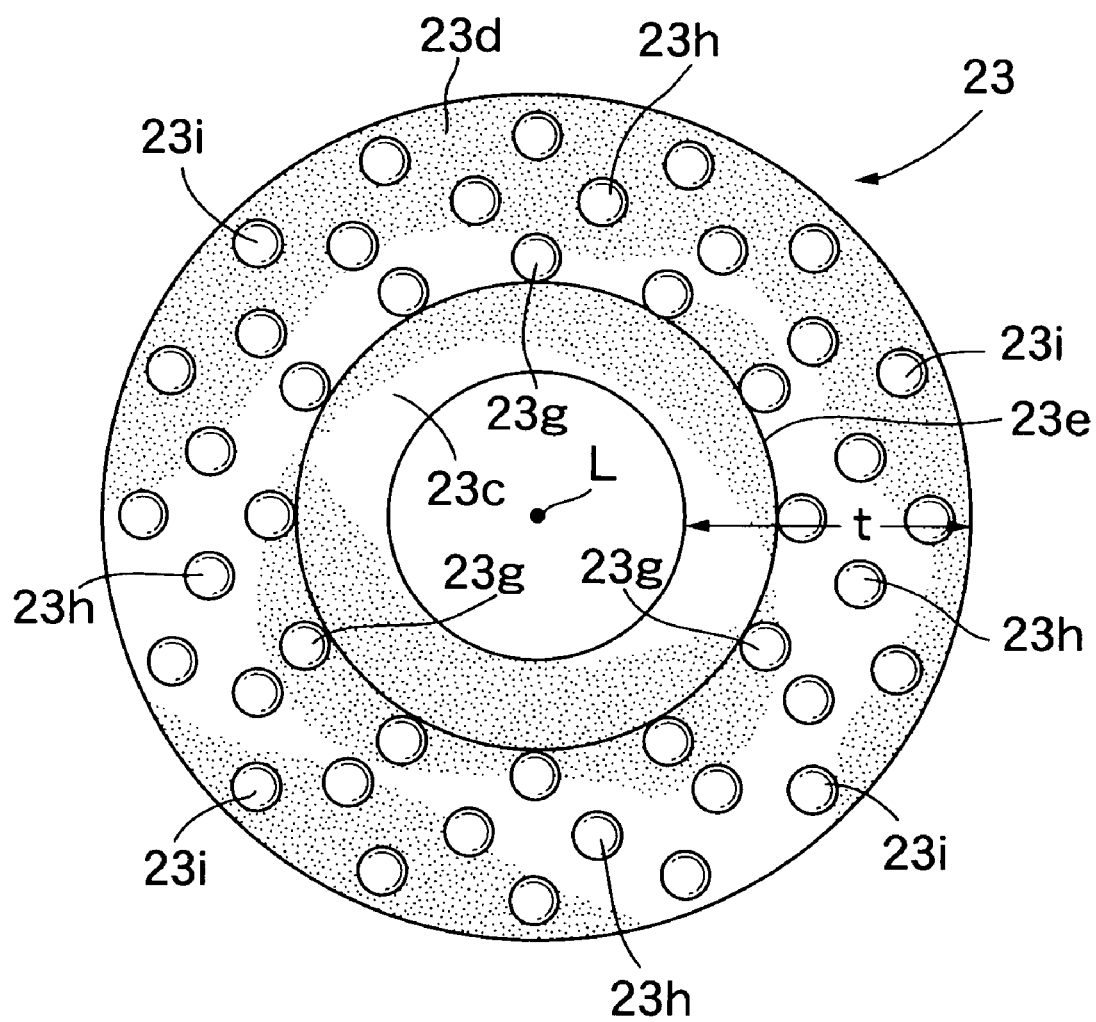
FIG. 3 is a view taken in the direction of the arrow 3 in FIG. 2.

As shown in FIGS. 2 and 3, the bump stopper 23 is constructed from a urethane resin that is formed into a substantially cylindrical shape having an axis L, and which includes, on an outer periphery of the bump stopper 23, a first annular groove 23a and a second annular groove 23b that is closer to the lower member 12 than the first annular groove 23a. An annular projection 19a provided on an inner peripheral surface of the bump stopper supporting member 19 engages the first annular groove 23a, wherein the bump stopper 23 is securely held by the bump stopper supporting member 19 and is prevented from falling off. A lower surface of the bump stopper 23 includes an inner conical surface 23c which tapers upward and an outer conical surface 23d which tapers downward. A circular apex part 23e surrounding the axis L is formed in a region where the conical surfaces 23c and 23d meet. A third annular groove 23f adjacent the inner conical surface 23c is formed on the inner peripheral surface of the bump stopper 23.

A plurality of partial spherical projections 23g, 23h and 23i are arranged in concentric circles on the outer conical surface 23d of the bump stopper 23. The radially innermost projections 23g are disposed adjacent the apex part 23e. The radially outermost projections 23i are disposed at a position near the outer peripheral surface of the bump stopper 23. The intermediate projections 23h are disposed between the inner and outer projections 23g and 23i.

Figure 4:
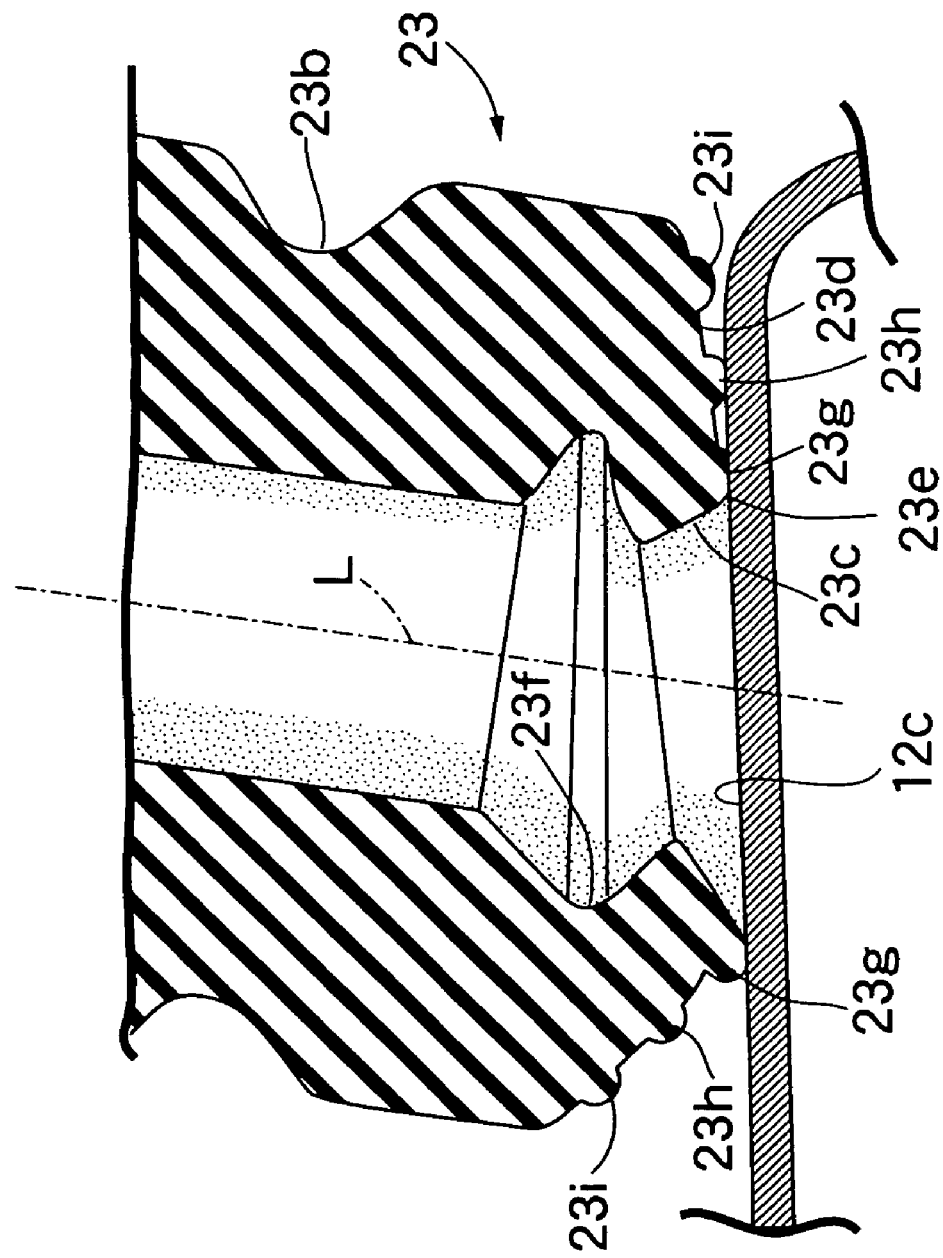
FIG. 4 is a sectional view which explains operation of the portion of the suspension system illustrated in FIG. 2.

Thus, as shown in FIG. 4, when the lower arm 11 swings upward (arrow A direction in FIG. 1) using the inner pivotal support part 12a as a fulcrum and following the vertical motion of the wheel, the suspension spring 17, disposed between the lower spring seat 14 on the lower arm 11 and the upper spring seat 15 on the vehicle body frame, is compressed while absorbing the impact. When an upward load inputted into the lower arm 11 is less than a predetermined value, the abutment surface 12c of the lower arm 11 does not abut on a lower end of the bump stopper 23. However, when the upward load equals a predetermined value or more, the abutment surface 12c of the lower arm 11 abuts the lower end of the bump stopper 23 and restricts the upper limit of an upward swing angle of the locker arm 11.

If the flat abutment surface 12c of the lower arm 11 is orthogonal to the axis L of the bump stopper 23 at the moment the abutment surface 12c abuts the lower end of the bump stopper 23, the abutment surface 12c significantly inclines relative to the axis L of the bump stopper 23 when the bump stopper 23 is sufficiently compressed. Accordingly, the abutment surface 12c is incapable of effectively compressing the bump stopper 23 in the direction of the axis L. Therefore, in this embodiment, in order to solve such a problem, the abutment surface 12c is allowed to abut the bump stopper 23 in a state wherein the abutment surface 12c is slightly inclined relative to the axis L of the bump stopper 23 when the abutment surface 12c abuts the lower end of the bump stopper 23.

However, with an arrangement where the lower surface of the bump stopper 23 only includes the outer conical surface 23d and does not include the inner conical surface 23c, as shown in the reference example of FIG. 5, namely, when the apex part 23e on the lower surface of the bump stopper 23 is located at the inner end in a direction of thickness t of the bump stopper 23, the bump stopper 23 easily falls toward the axis L side due to the load exerted by the abutment surface 12c of the lower arm 11 (see arrow B). As such, the bump stopper 23 slips relative to the surface of the abutment surface 12c, leading to the generation of abnormal noises. An unacceptable and excessive amount of abnormal noises is generated when dust adheres to the abutment surface 12c of the lower arm 11.

On the other hand, in this embodiment, the lower surface of the bump stopper 23 includes the inner conical surface 23c, the outer conical surface 23d, and the apex part 23e on the lower surface of the bump stopper 23 in a position near the center in the direction of the thickness t of the bump stopper 23. Therefore, even if the apex part 23e receives the load in the diagonal direction from the abutment surface 12c of the lower arm 11, it is difficult for the bump stopper 23 to fall toward the axis L side and/or slip relative to the surface of the abutment surface 12c, thus suppressing the generation of unwanted abnormal noises.

When the lower surface of the bump stopper 23 is in surface contact with the abutment surface 12c of the lower arm 11, a large amount of abnormal noises is generated upon the slip of the contact portion. However, in this embodiment, the plurality of projections 23g, 23h and 23i, provided on the lower surface of the bump stopper 23, are in point contact with the abutment surface 12c, wherein the amount of abnormal noises generated, when the projections 23g, 23h and 23i slip relative to the abutment surface 12c, is reduced compared with the case of surface contact.

The embodiment of the present invention has been described above, but various design changes can be made without departing from the subject matter of the present invention.

For example, the lower arm 11 is shown as an example of the swing member in the embodiment, but the swing member is not limited thereto.

The bump stopper 23 is provided on the vehicle body side in the embodiment, but the bump stopper 23 may be provided on the swing member side.

The bump stopper 23 is generally formed into the cylindrical shape in the embodiment, but only the tip end thereof may be formed into a cylindrical shape.

The scope of the present invention encompasses a bump stopper 23 of the embodiment shown in FIG. 1 to FIG. 4 from which the projections 23g, 23h and 23f are omitted, as well as a bump stopper 23 in the reference example shown in FIG. 5 which is provided with the projections 23g, 23h and 23i.

The material of the bump stopper 23 of the embodiment is not limited to urethane resin, and may be natural rubber and the like.

What is claimed is:

1. A vehicle suspension system, which restricts a maximum bump amount of a vehicle body, and connects a swing member rotatably supporting a wheel and swinging up and down to the vehicle body via a suspension spring, the vehicle suspension system comprises:
    a bump stopper supporting member;
    a spacer encompassed by the bump stopper supporting member; and
    a bump stopper provided on one of the swing member and the vehicle body, wherein a lowermost portion of the spacer extends into an internal cavity of the bump stopper and an upper part of the bump stopper is held between and directly against an outer surface of the spacer and an inner surface of a lower part of the bump stopper supporting member, the bump stopper comprising:
        an axis;
        a substantially cylindrical tip end which abuts an abutment surface provided on the other one of the swing member and the vehicle body; and
        an apex formed at the tip end of the bump stopper,
    wherein abutment is initiated, in a circumferential direction of the tip end, in a state wherein the abutment surface inclines relative to the axis of the bump stopper, and
    wherein the apex at the tip end of the bump stopper first abuts the abutment surface and is located at an intermediate portion of the bump stopper in a direction of a wall thickness (t) of the bump stopper.

2. The vehicle suspension system according to claim 1, wherein the bump stopper is manufactured from a urethane resin.

3. The vehicle suspension system according to claim 1, wherein the bump stopper is manufactured from a natural rubber.

4. The vehicle suspension system according to claim 1, wherein the bump stopper further comprises at least one annular groove.

5. The vehicle suspension system according to claim 4, wherein the at least one annular groove is located on an outer surface of the bump stopper.

6. The vehicle suspension system according to claim 5, wherein the at least one annular groove comprises a first annular groove and a second annular groove, wherein the second annular groove is located closer to the abutment surface than the first annular groove.

7. The vehicle suspension system according to claim 4, wherein the at least one annular groove is located on an inner surface of the bump stopper.

8. The vehicle suspension system according to claim 1, wherein the bump stopper further comprises an outer conical surface and an inner conical surface, and wherein the apex is formed in a region where the outer conical surface abuts the inner conical surface.

9. The vehicle suspension system according to claim 8, wherein the outer conical surface and inner conical surface taper in opposite directions relative to each other.

10. The vehicle suspension system according to claim 1, wherein said spacer is inserted inside an inner peripheral surface of the upper part of the bump stopper and placed at an outer peripheral side thereof in abutment against the inner peripheral surface of the upper part of the bump stopper and wherein an outer peripheral surface of the upper part of the bump stopper is placed in abutment against an inner surface side of a lower part of the bump stopper support member.

11. A vehicle suspension system, which restricts a maximum bump amount of a vehicle body, and connects a swing member rotatably supporting a wheel and swinging up and down to the vehicle body via a suspension spring, the vehicle suspension system comprises:
    a bump stopper provided on one of the swing member and the vehicle body, the bump stopper comprising:
        an axis;
        a substantially cylindrical tip end which abuts an abutment surface provided on the other one of the swing member and the vehicle body, the abutment surface inclining relative to the axis of the bump stopper; and
        at least one projection formed at the tip end of the bump stopper, wherein the at least one projection first abuts the abutment surface.

12. The vehicle suspension system according to claim 11, wherein a plurality of projections capable of abutting the abutment surface and including said at least one projections are formed on the tip end of the bump stopper, wherein abutment is initiated, in a circumferential direction of the tip end, in a state wherein the abutment surface inclines relative to the axis of the bump stopper, and
    wherein the plurality of projections are arranged in a plurality of concentric circles on an outer conical surface of the bump stopper.

13. The vehicle suspension system according to claim 12, wherein the bump stopper is manufactured from one of either a urethane resin or a natural rubber.

14. The vehicle suspension system according to claim 12, wherein the bump stopper further comprises at least one annular groove.

15. The vehicle suspension system according to claim 14, wherein the at least one annular groove is located on an outer surface of the bump stopper.

16. The vehicle suspension system according to claim 15, wherein the at least one annular groove comprises a first annular groove and a second annular groove, wherein the second annular groove is located closer to the abutment surface than the first annular groove.

17. The vehicle suspension system according to claim 14, wherein the at least one annular groove is located on an inner surface of the bump stopper.

18. The vehicle suspension system according to claim 12, wherein the bump stopper further comprises an outer conical surface and an inner conical surface, and wherein the apex is formed in a region where the outer conical surface abuts the inner conical surface.

19. The vehicle suspension system according to claim 18, wherein the outer conical surface and inner conical surface taper in opposite directions relative to each other.

20. The vehicle suspension system according to claim 11, wherein the at least one projection is formed at a tip end of a lowermost portion of the bump stopper.

21. The vehicle suspension system according to claim 11, wherein an apex formed at the tip end of the bump stopper that first abuts the abutment surface is located at an intermediate portion of the bump stopper in a direction of a wall thickness (t) of the bump stopper and said at least one projection is located adjacent to the apex.

* * * * *